US009661056B2

(12) United States Patent
Selvaraj et al.

(10) Patent No.: US 9,661,056 B2
(45) Date of Patent: May 23, 2017

(54) MODIFICATION FREE EXTENSION OF WEB BASED APPLICATIONS

(71) Applicants: Clement Selvaraj, Bangalore (IN); Santosh Kumar Addanki, Palo Alto, CA (US); Prakash Ponshankaarchinnusamy, Palo Alto, CA (US); Andreas Kunz, Karlsruhe (DE); Peter Muessig, Untereisesheim (DE)

(72) Inventors: Clement Selvaraj, Bangalore (IN); Santosh Kumar Addanki, Palo Alto, CA (US); Prakash Ponshankaarchinnusamy, Palo Alto, CA (US); Andreas Kunz, Karlsruhe (DE); Peter Muessig, Untereisesheim (DE)

(73) Assignee: SAP SE, Walldorf (DE)

(*) Notice: Subject to any disclaimer, the term of this patent is extended or adjusted under 35 U.S.C. 154(b) by 517 days.

(21) Appl. No.: 14/253,114

(22) Filed: Apr. 15, 2014

(65) Prior Publication Data
US 2015/0295985 A1  Oct. 15, 2015

(51) Int. Cl.
G06F 3/048 (2013.01)
H04L 29/08 (2006.01)
G06F 17/30 (2006.01)

(52) U.S. Cl.
CPC .......... H04L 67/02 (2013.01); G06F 17/3089 (2013.01)

(58) Field of Classification Search
CPC .......... G06F 17/3089; G06F 17/30893; G06F 17/30896; H04L 67/02

USPC .................................................. 715/760, 762
See application file for complete search history.

(56) References Cited

U.S. PATENT DOCUMENTS

| | | | |
|---|---|---|---|
| 6,222,537 B1 | 4/2001 | Smith et al. | |
| 6,971,086 B2 | 11/2005 | Reddy et al. | |
| 7,853,899 B1 | 12/2010 | Damaschke et al. | |
| 8,370,751 B2 | 2/2013 | Graeff et al. | |
| 8,601,447 B2 | 12/2013 | Browne et al. | |
| 8,627,222 B2 | 1/2014 | Hartwell et al. | |
| 2004/0046789 A1 | 3/2004 | Inanoria | |
| 2009/0144640 A1* | 6/2009 | Schneider | G06F 17/30905 715/760 |
| 2010/0162147 A1 | 6/2010 | Ritter et al. | |
| 2012/0166979 A1 | 6/2012 | Lewontin | |
| 2012/0310990 A1 | 12/2012 | Viegas et al. | |
| 2012/0324377 A1 | 12/2012 | Allington et al. | |
| 2013/0263110 A1 | 10/2013 | Fippel | |
| 2014/0006368 A1 | 1/2014 | Moser et al. | |
| 2014/0007042 A1 | 1/2014 | Channes et al. | |
| 2014/0013451 A1 | 1/2014 | Kulka et al. | |
| 2014/0059381 A1 | 2/2014 | Lock | |

* cited by examiner

Primary Examiner — Ajay Bhatia
Assistant Examiner — Phuong Nguyen
(74) Attorney, Agent, or Firm — Fountainhead Law Group P.C.

(57) ABSTRACT

A system is described for creating a customized modification free extension of a software application. The software application can be an application configured to be executed in a runtime framework on a web browser. When the web browser launches the custom application, the base application can be identified and retrieved. Once retrieved, the web browser can merge the custom application and the base application and execute the resulting merged application.

9 Claims, 8 Drawing Sheets

MODIFICATION FREE EXTENSION OF WEB BASED APPLICATIONS

BACKGROUND

In today's fast paced business environment, enterprise business applications are often offered as web based applications so that they can be run on conventional browsers available on most electronic devices. A service provider can offer the enterprise business application to its customers through a license or purchase agreement. However often times the enterprise business application provided by the service provider may not perfectly suit the customer's specific business requirements. The customer can address this issue by modifying the enterprise business application or alternatively creating an entirely new enterprise business application that is customized to the customer's requirements (thus not taking advantage of the enterprise business application provided by the service provider).

Both of these solutions have issues when it comes to supportability of the enterprise business application. In the first case, customer-made modifications to the enterprise business application can be incompatible with when application updates are provided by the service provider thus breaking the application. In the second case, customer-made enterprise business applications are unable to take advantage of future improvements created by the service provider since the customer-made enterprise business application is a standalone that does not reference the enterprise business application. As a result, business applications that have been customized for a customer can be an expensive investment.

SUMMARY

In one embodiment, a computer-implemented method launches, by the processor, the custom application from inside a web browser. The method then determines, by the processor, that the custom application extends a base application provided by a service provider. The method then retrieves, by the processor, the base application from the service provider. The method then merges, by the processor, the base application and the custom application. The method finally executes, by the processor, the merged application on the web browser.

In another embodiment, a non-transitory computer readable storage medium stores one or more programs comprising instructions for launching the custom application from inside a web browser, determining that the custom application extends a base application provided by a service provider, retrieving the base application from the service provider, merging the base application and the custom application, and executing the merged application on the web browser.

In another embodiment, a computer implemented system comprises one or more computer processors and a non-transitory computer-readable storage medium. The non-transitory computer-readable storage medium comprises instructions, that when executed, control the one or more computer processors to be configured for launching the custom application from inside a web browser, determining that the custom application extends a base application provided by a service provider, retrieving the base application from the service provider, merging the base application and the custom application, and executing the merged application on the web browser.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments described herein enable a client to create a custom application that is a modification free extension of a base application. As used herein, the term modification free means that the custom application does not modify the base application. Modification free can also mean that the custom application is compatible with different versions of the base application. For instance, the custom application can take advantage of new functionality that is available in an update of the base application. In some embodiments, the custom application can use a variety of extension mechanisms that extend the base application without modifying the base application. These extension mechanisms will be discussed in detail below.

Figure 1:
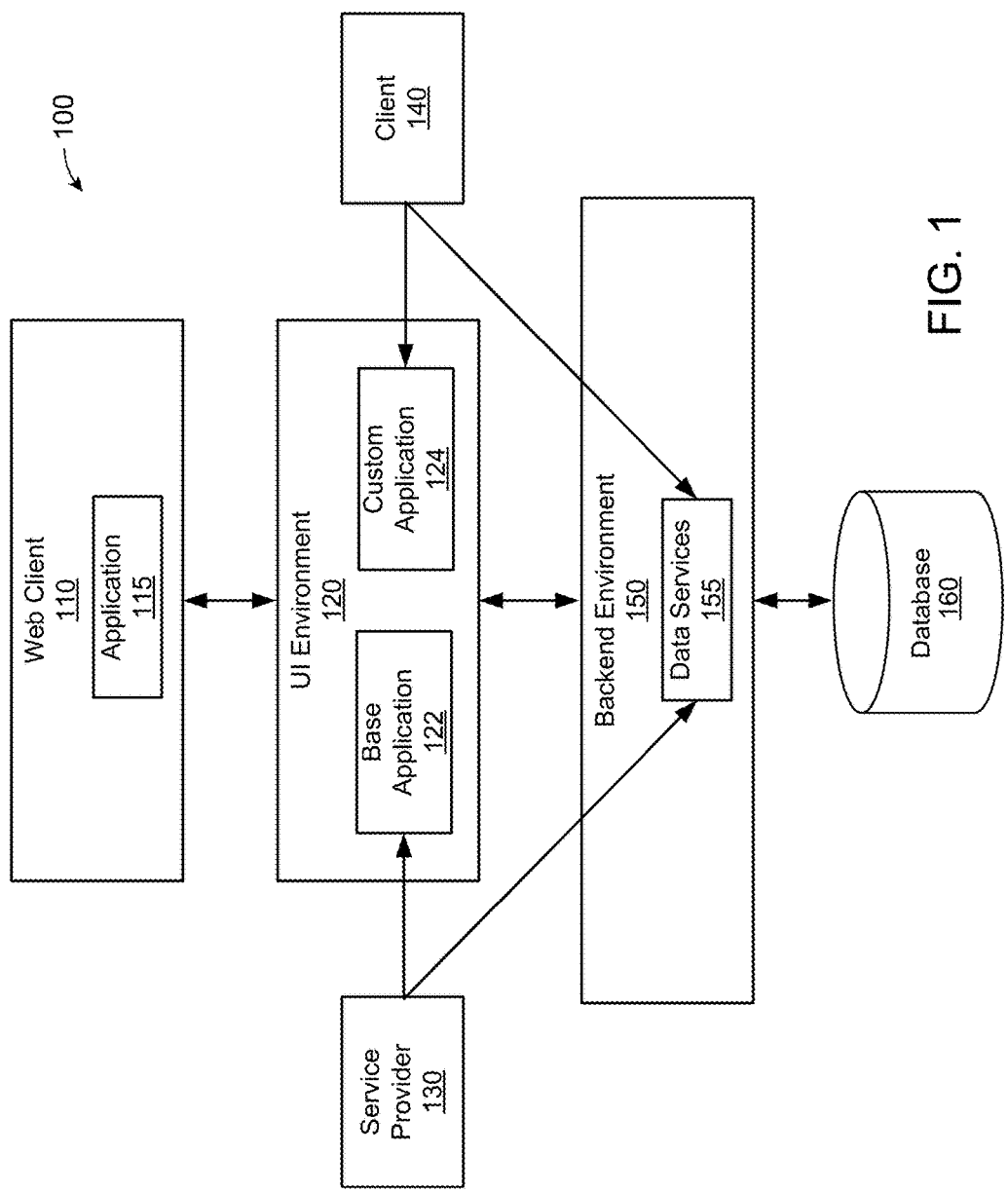
FIG. 1 illustrates a system according to one embodiment.

FIG. 1 illustrates system 100 according to one embodiment. System 100 includes web client 110, user interface (UI) environment 120, service provider 130, client 140, backend environment 150, and database 160. Database 160 is configured to store data belonging to application objects. The data can be made available to web client 110 via application 115. Application object data can be distributed on several tables of database 160. Data Services 155 of backend environment 150 can retrieve data stored in the tables and make it available to UI environment 120. Data services 155 can also access a local database storing other application object data. For example, data specific to custom application 124 can be stored in a local database rather than database 160.

UI environment 120 includes base application 122 and custom application 124. Base application 122 can be a software application that is provided by service provider 130 for the purpose of presenting data stored in database 160. In some examples, the software application can be a business enterprise application. The business enterprise application can be web based application that is accessible through a conventional web browser. Service provider 130 may create base application 122 or receive base application 122 from a third party. In some examples, service provider 130 can modify or extend data services 155 to create new function calls that are utilized by base application 122. For example, a new function call to collect data for a particular view in base application 122 can be generated and stored in data services 155.

In contrast, custom application 124 can be a customized software application created by client 140 to extend a base application 122. Extension of base application 122 can include modifying the data or functionality of base application 122. In one embodiment, extension can include modifying a view of base application 122. In another embodiment, extension can include modifying or adding to data utilized by base application 122. In yet other embodiments, extension can include modifying a controller of base application 122. Client 140 can extend data services 155 by creating new function calls or modifying existing function calls that are utilized by custom application 124.

In some embodiments, custom application 124 can be modification free. In other words, custom application 124 does not modify base application 122 and can reference multiple versions of base application 122. If service provider 130 were to for example provide an updated version of base application 122 to UI environment 120, custom application 124 would be compatible with and be able to extend the updated version of base application 122. Similarly, an updated version of custom application 124 would also be compatible with the current version of base application 122. In essence, different versions of base application 122 and custom application 124 would be compatible with one another.

In some embodiments, UI environment 120 can provide both base application 122 and custom application 124 to web client 110. Web client 110 can, during runtime, merge custom application 124 and base application 122 to generate application 115, which is a runtime application of base application 122 that has been extended using custom application 124. In one example, web client 110 can retrieve custom application 124. The most up to date version of custom application 124 can be retrieved by default if a particular version is not specified. Web client 110 can process custom application 124 and generate a request to retrieve base application 122 which corresponds to custom application 124. This can be the most up to date version of base application 122 by default if a particular version is not specified. Once base application 122 has been retrieved, web client 110 can merge custom application 124 and base application 122 to generate application 115. In other embodiments, UI environment 120 can merge base application 122 and custom application 124 instead of web client 110. Thus, application 115 is provided to web client 110 instead of having application 115 being generated at runtime. In the following figures, techniques for extending the resources, views, and controllers of base application 112 will be described.

Figure 2:
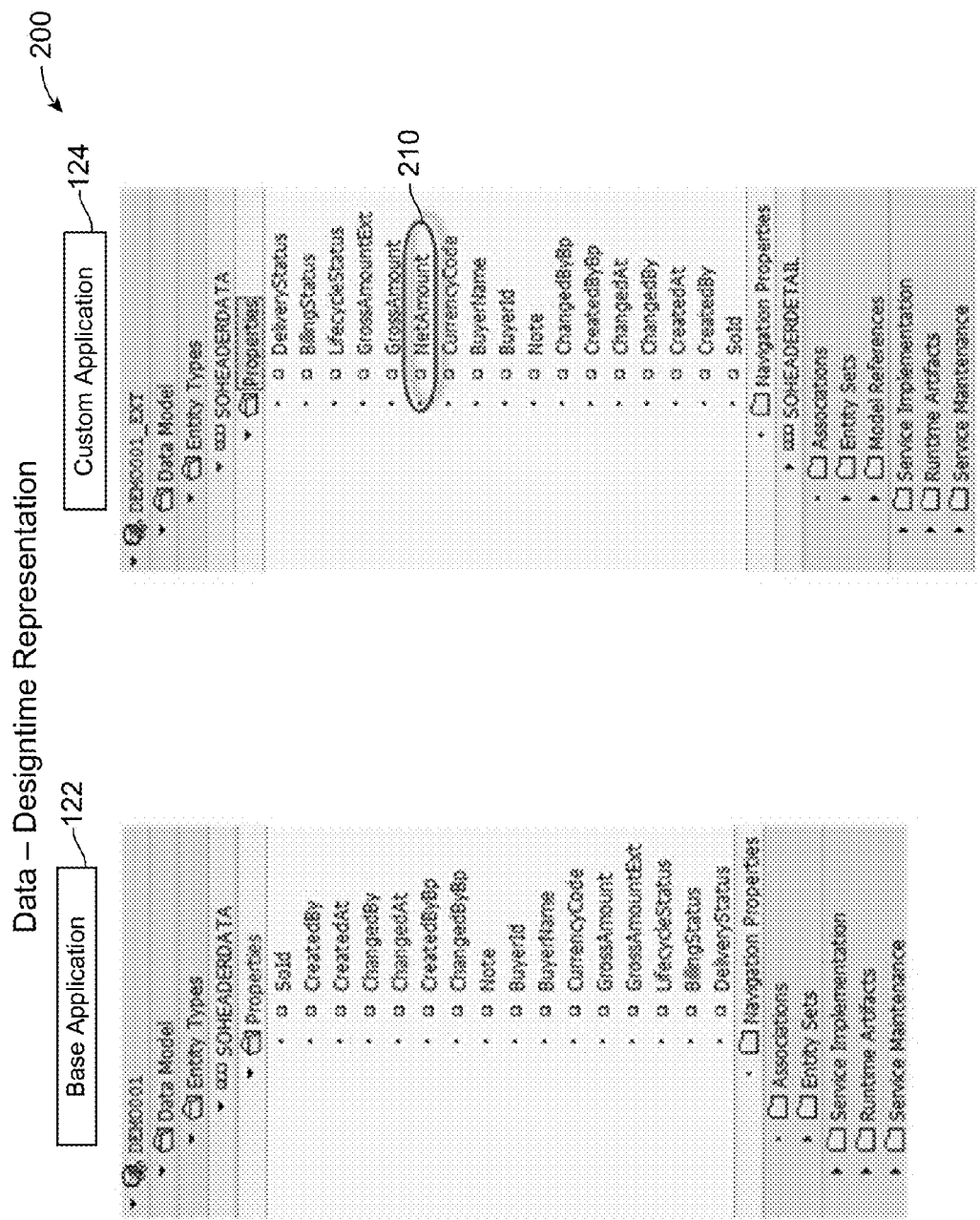
FIG. 2 illustrates a designtime representation of data available to a base application and a custom application according to one embodiment.

FIG. 2 illustrates a designtime representation of data available to a base application and a custom application according to one embodiment. Resource extension is the modification or extension of the resources available to an application. The resources can be used to generate views to present information to web client 140. For instance, a base application retrieves data (e.g., resources) from database 160 and processes the data to generate views for presenting data on application objects to web client 140. Custom application 124 can extend the resources by adding new data or modifying existing data in database 160. As shown in FIG. 2, base application 122 has a data model that includes multiple properties. Each property stores data that is accessible to base application 122. The data can be stored in database 160. In contrast, custom application 124 has an extended data model that includes the properties accessible by base application 122 plus property 210 titled "NetAmount." As such, the property NetAmount has been added into the resources of custom application 124. In one embodiment, custom application 124 can store the extended property locally within custom application 124. In another embodiment, the extended property can be stored in a database of backend environment 150 and can be made available to custom application 124 through data request calls to data services 155. Client 140 can modify the functionality of data services 155 such that data services 155 can by default check a database of backend environment 150 for a property before querying database 160 for the property when a data request is received from custom application 124. This allows custom application 124 to extend the resources without modifying the underlying database of base application 122.

Figure 3:
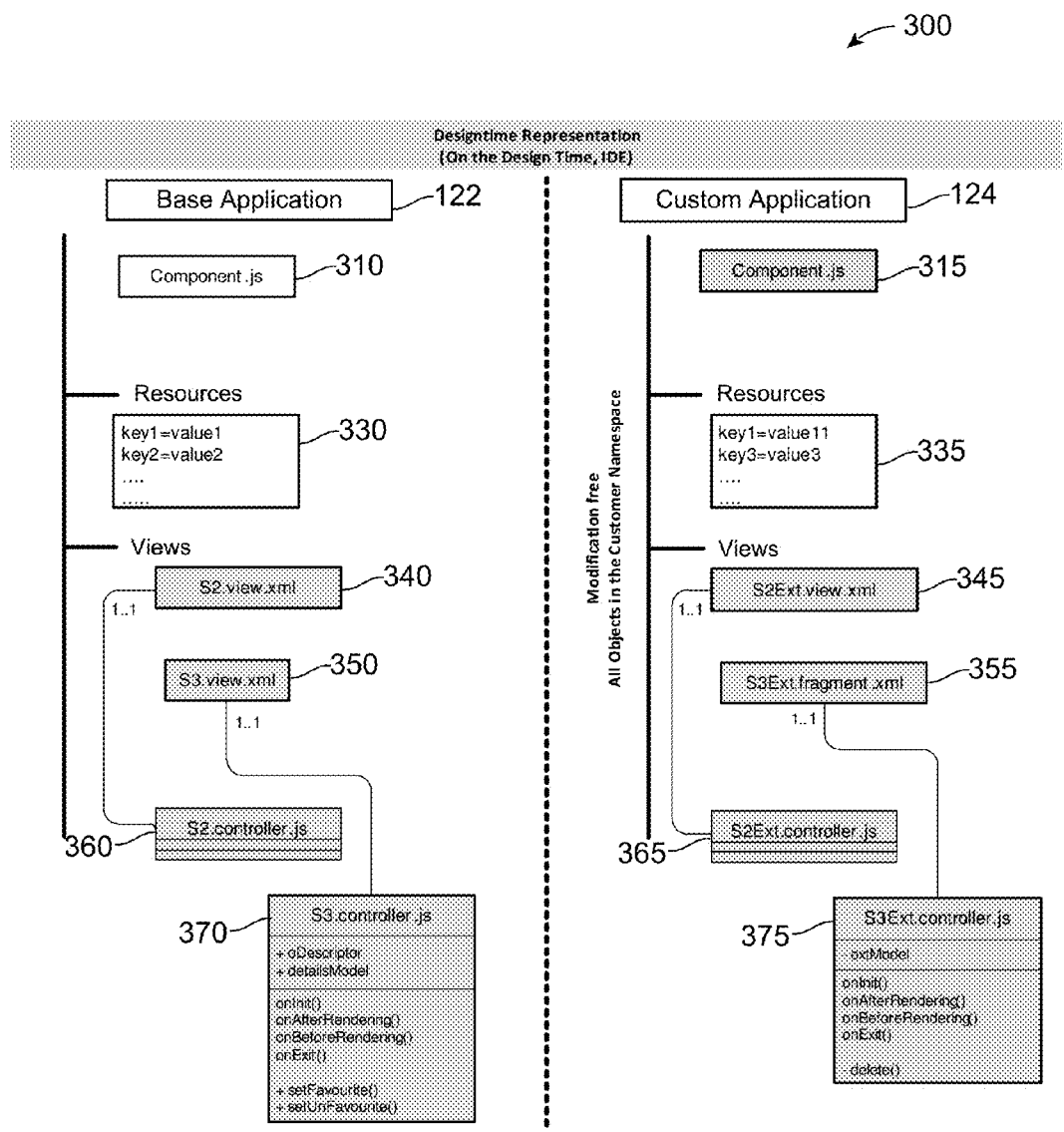
FIG. 3 illustrates a designtime representation of a base application and a custom application according to one embodiment.

FIG. 3 illustrates a designtime representation of a base application and a custom application according to one embodiment. On the left side of designtime representation 300 is base application 122 which includes component 310, configuration 320, resources 330, view S2 340, view S3 350, S2 controller 360, and S3 controller 370. Component 310 is configured to store configuration information for managing base application 122. This can include managing a portion of an application screen or the entire application screen. For example, component 310 can configure which views will be included in the application, navigation between views of the application, initialization of the UI, and other UI-related configurations. Component 310 can inherent this functionality from base classes. Resources 330 represents the data that is available to base application 122. View S2 340 is a first view of the base application. S2 controller 360 provides the functionality for view S2 340. Similarly, view S3 350 is a second view of the base application and S3 controller 370 provides the functionality for view S3 350.

On the right side of designtime representation 300 is custom application 124. Custom application 124 includes component 315. Component 315 also stores configuration information to configure and manage custom application 124. Component 315 can also store extensions configuration to define the mapping between base application 122 and custom application 124. For example, component 315 can specify an extension or modification within custom application 124 that should be combined with a portion of base application 122. By default, custom application 124 can reference resources, views, or components of base application 122 unless the resource, view, or component is extended within custom application 124. Custom application 124 also includes resources 335. Resources 335 can define properties within resources 330 of base application 122 that are being extended in custom application 124. Extension can include new properties or modification to existing properties. Here, resources 335 include key 1 with a value 11 and key 3 with a value 3. Key 1 exists in resources 330 of the base application 122 and therefore key 2 is being extended with value 11 in custom application 124. However, key 1 in database 160 still stores the value 1 since base application 122 and its corresponding resources are not modified by custom application 124. Key 3 does not exist in resources 330 and thus is a new property in custom application 124 that does not exist in base application 122. Resources 335 can be stored as part of custom application 124 or alternative can be stored in a separate database from database 160.

Custom application 124 can include views and their corresponding controllers. A view within custom application 124 can either extend, modify, or replace a view in base application 122. View extension is the modification of rows, columns, or fields in a view. The modification can be adding fields to a view. In one embodiment, view extension can be implemented by provisioning extension points that exist within a view of base application 122. A view of base application 122 can include one or more extension points at specific places in the view where it is likely that customs may want to insert custom content. The customer can associate custom content to an extension tag that corresponds to an extension point. Through the extension tag, custom content can be inserted at an extension point.

View modification is the modification of the appearance of a view. A view can be modified by removing fields, rearranging fields, or otherwise changing the presentation of data in the view. In one embodiment, a base application 122 may include a view name/ID pair for each control in the view. In one example, a view name along with a control ID can uniquely determine the control in the SAP delivered application which the view is modifying. A custom application can modify the view by changing a control in a view.

View replacement is the replacement of a view in base application 122. Custom application 124 can replace an entire view in base application 122. View replacement can be appropriate when the desired changes are too cumbersome or complicated to be expressed using view modification or view extension.

In some embodiments, custom application 124 can also extend or replace a controller that corresponds to a view. Controller extension can be extending methods of the same name in the controller. Controller replacement can be replacing methods of the same name in the controller. In one embodiment, a method in the custom controller can override a method with the same name in the base controller except when the method is a lifecycle method. Lifecycle methods are methods which are related to the lifecycle of the application. Examples include onInit (a method that is called when the application is initiated), onExit (a method that is called when the application is exiting), onBeforeRendering (a method that is called before the application renders a view), and onAfterRendering (a method that is called after the application renders a view). A lifecycle method on the custom controller can extend a lifecycle method on the base controller. As such, the lifecycle method on the custom controller can be called in addition to the lifecycle method on the base controller.

In one embodiment, the type of lifecycle method can determine whether the custom controller's version is called before the base controller's version. For instance, the custom controller's version can be called after the base controller's version for onInit and onAfterRendering methods while the custom controller's version can be called before the base controller's version for onExit and onBeforeRendering methods. This can be because of the nature of an extension and the dependency between base code and extension code. The base controller is not aware of anything the custom controller does. But the custom controller knows what the base controller does and typically builds on top of this behavior. For example, in onInit the base controller may create and initialize some objects. On top of that, the custom controller could create other objects, initialize them and attach them to the already existing objects of the base controller. So the onInit of the custom controller is executed after the onInit of the base controller. Similarly, onExit is called at the end of the lifecycle of the controller and is used for cleaning up, properly shutting down, and freeing resources which are no longer needed. Since extension objects are attached to base objects, they would need to be cleaned up prior to cleaning up of the base objects. As a result, the onExit of the custom controller is executed before the onExit of the base controller.

As shown here in FIG. 3, custom application 124 include S2 extension view 345. According to component 315, S2 extension view 345 is a replacement of S2 view 340. In other words, S2 extension view 345 is configured to replace S2 view 340 in custom application 124. Methods that are related to S2 extension view 345 is stored within S2 extension controller 365 while methods that are related to S2 view 340 are stored within S2 controller 360. Custom view 124 further includes S3 extension fragment view 355. A fragment view is a modification or extension of an existing view. Thus, S2 extension fragment view 355 is a modification or extension of S3 view 350. S3 extension controller 375 stores methods that are used by S3 extension fragment view 355 while S3 controller 270 stored methods that are used by S3 view 350.

Figure 4:
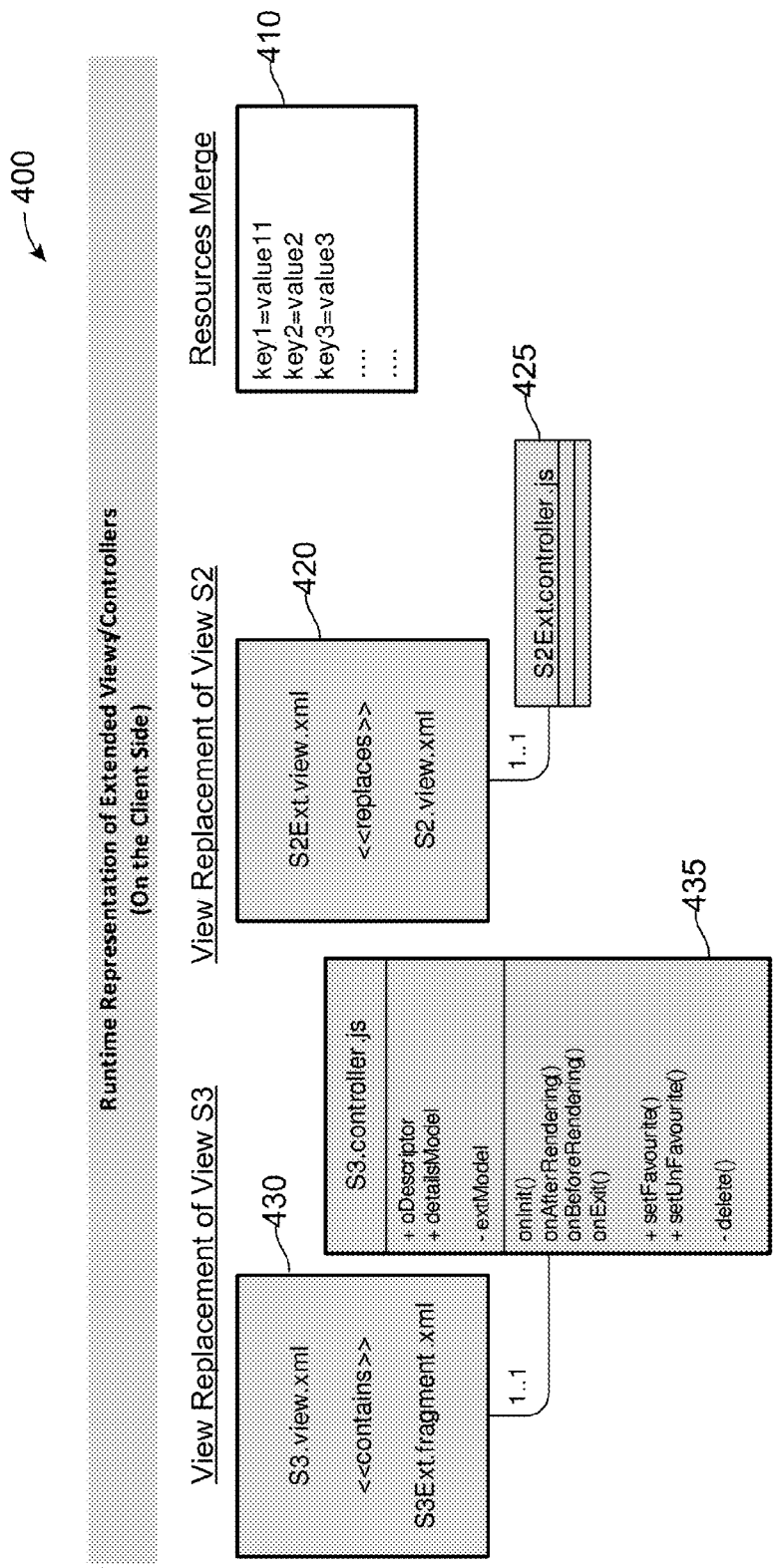
FIG. 4 illustrates a runtime representation of a base application and a custom application according to one embodiment.

FIG. 4 illustrates a runtime representation of a base application and a custom application according to one embodiment. Runtime representation 400 illustrates the custom application after merging the custom application with the base application. As shown, resources 330 and 335 have been merged to form resources 410. Resources 410 include value 11 for key 1 (extended value from resources 335), value 2 for key 2 (default value referenced from resources 330), and value 3 for key 3 (defined value from resources 335). For custom view S2 420, S2 extended view 345 replaces S2 view 340. Since a replacement has occurred, S2 controller 360 is no longer referenced by the custom application during runtime. Instead, custom controller S2 425 references S2 extension controller 365. Custom view S3 430 is merges S3 view 350 with S3 extension fragment view 355. As a result, custom S3 view contains both S3 view 350 and S3 extension fragment view 355. Since S3 view 350 is being extended, custom controller S3 435 includes method from both S3 controller 370 and S3 extension controller 375. Methods having unique names are included in custom controller S3 435. For instance, custom controller S3 435 includes methods oDescriptor, detailsModel, setFavourite, and setUnFavourite from S3 controller 370. Custom controller S3 435 also includes methods extModel and delete from S3 extension controller 375. Custom application can call lifecycle methods onInit, onAfterRendering, onBeforeRendering, and onExit from both S3 controller 370 and S3 extension controller 375 during runtime. The order in which the lifecycle methods are called can depend on the functionality of the lifecycle method.

Figure 5B:
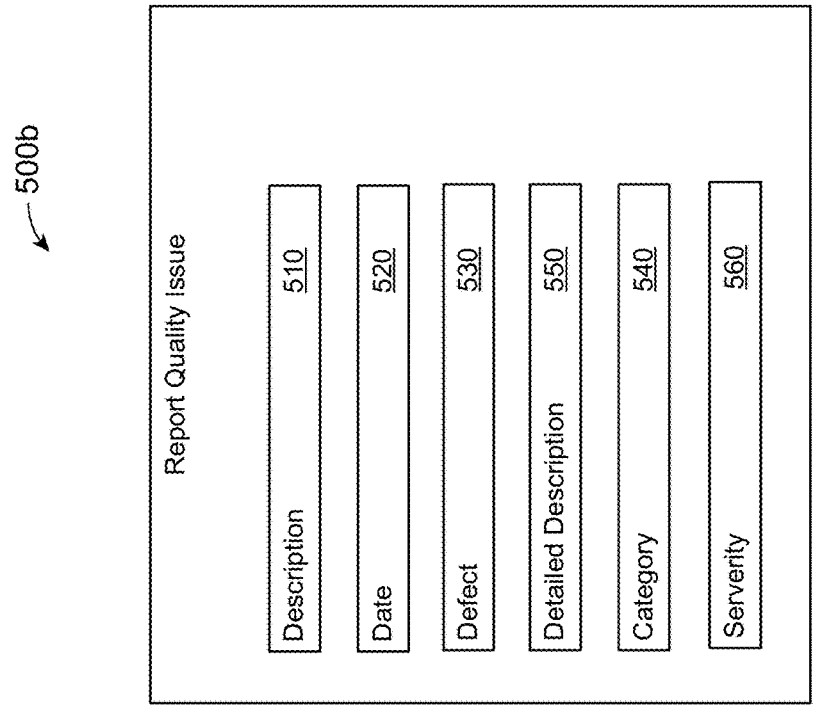
FIG. 5b illustrates a view from a custom application according to one embodiment.
Figure 5A:
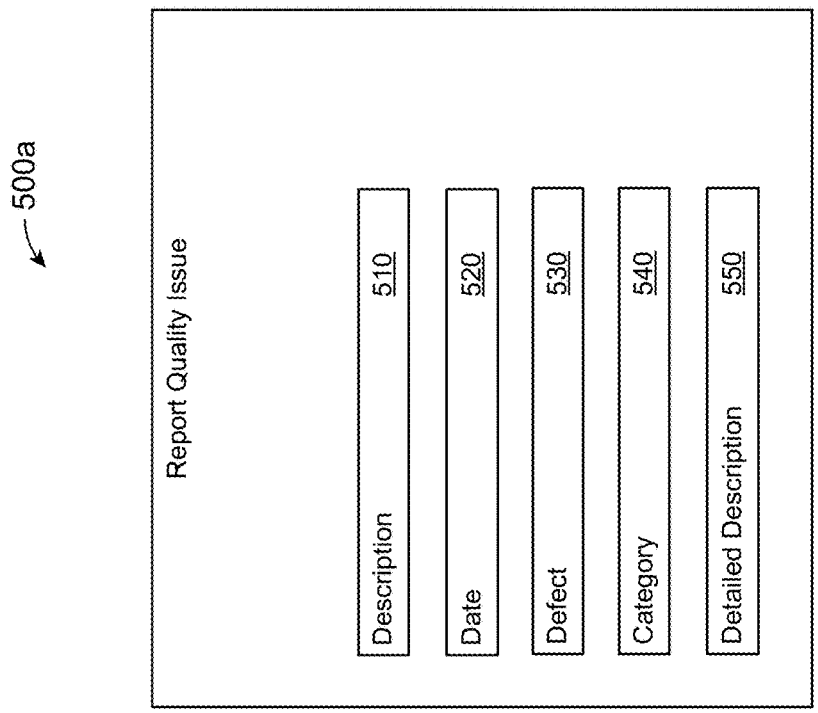
FIG. 5a illustrates a view from a base application according to one embodiment.

FIG. 5a illustrates a view from a base application according to one embodiment. View 500a is configured to report a quality issue with a product. View 500a includes an ordered list of fields. Description field 510 is followed by date field 520, defect field 530, category field 540, and detailed description field 550. Each field can present information from a database to the client. FIG. 5b illustrates a view from a custom application according to one embodiment. The custom application is an extension of the base application. As shown, view 500b is also includes an ordered list of field.

However, the fields are in a different order than view 500*a* of the base application. Moreover, severity field 560 appears in view 500*b* but not in view 500*a*. View 500*b* starts with description 510 followed by date field 520, defect field 530, detailed description field 550, category field 540, and severity field 560.

Figure 6:
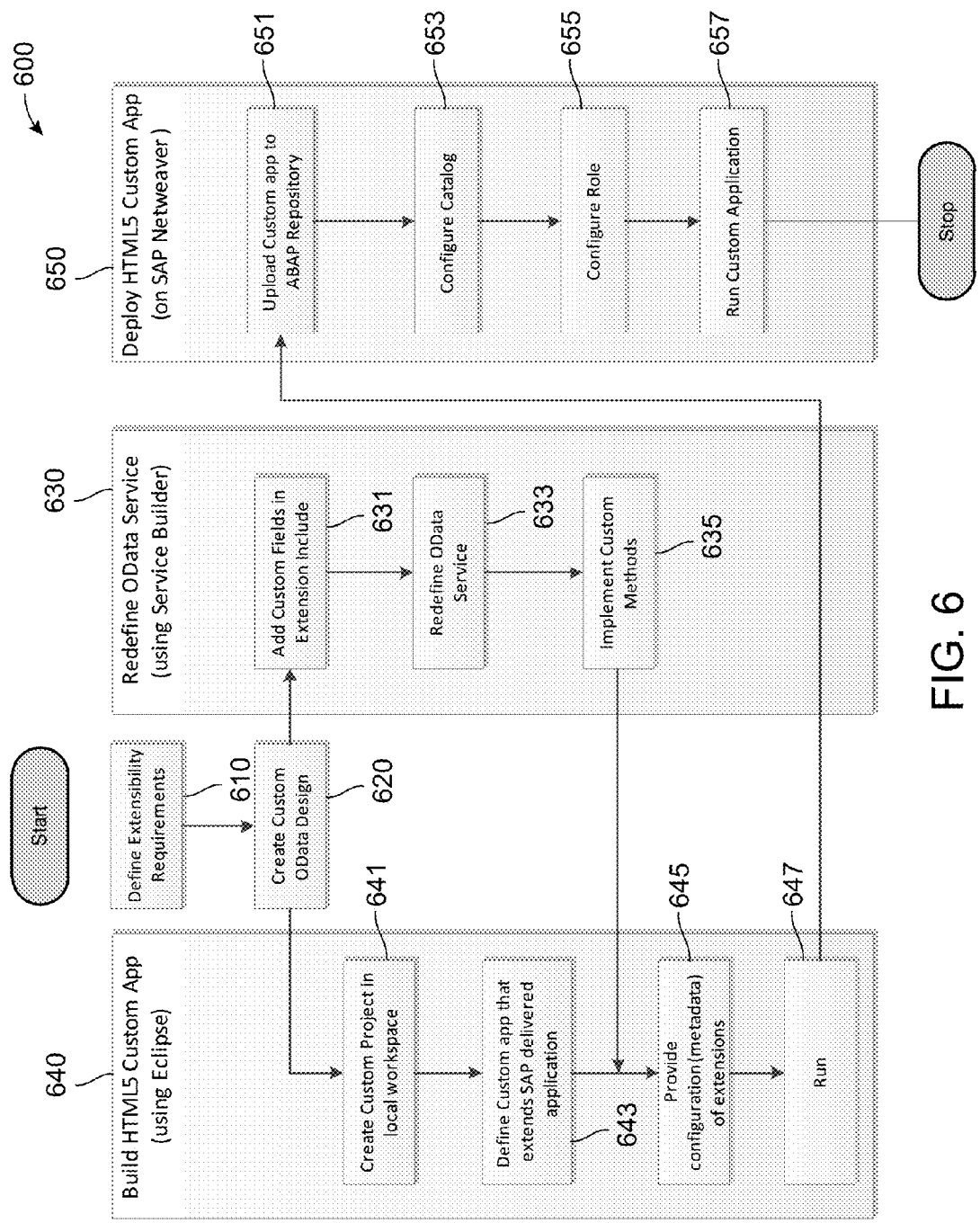
FIG. 6 illustrates a process flow for deploying a custom application according to one embodiment.

FIG. 6 illustrates a process flow for deploying a custom application according to one embodiment. Process 600 can begin with a client defining extensibility requirements at 610. The extensibility requirements are a blueprint to define the changes to the base application that the client would like to see in the custom application. Process 600 then continues with the client creating a custom OData design at 620. The custom OData design can contain new properties that were not present in the base application or can change the values of properties in the base application.

Process 600 then continues by redefining the OData Service in the backend environment at 630. Redefining the OData service can be performed by a client using an OData service builder. Redefining the OData service can include adding custom fields in the extension include at 631. Redefining the OData service can also include redefining the OData service based on the new custom fields at 633. Redefining the OData service can also include implementing custom methods at 635. The custom methods can be to access the new custom fields in the extension include. After the new custom methods are implemented, the function calls for the new custom methods can be passed to a custom application builder, thus allowing the custom application builder to utilize the newly created custom methods.

After the backend environment has been updated, process 600 can continue by building the custom application using a custom application builder at 640. The custom application can be a HTML5 application. Building the custom application can include creating a custom project in a local workspace at 641. Building the custom application can also include defining the custom application at 643. Defining the custom application can include adding in view extensions, view modifications, resource extensions, controller extensions, controller replacements and view replacements. Views, resources, and controllers in the base application that have not been defined in the custom application can remain the same in the custom application. Building the custom application can also include providing configuration metadata of the extensions at 645. The configuration metadata can be stored as extensions configuration in component 315. Once the custom application has been built, the custom application can be run at 647.

Process 600 can continue by deploying the new custom application once the custom application has been created at 650. Deployment of the new custom application can include uploading the custom application to the application repository accessible to clients at 651. Deployment of the custom application can also include configuring a catalog to include the custom application at 653. A catalog is a group of applications that have been bundled for a client. For example, the catalog can contain one or more applications provided by the service provider that have been provisioned for a given customer. Deployment of the custom application can also include configuring the client roles who may use the custom application at 655. In some examples, only certain personnel in a company can use the custom application. This can be based on the personnel's role in the company. For instance, only personnel having the role of an administrator can run the custom application. Once the custom application has been deployed, it can remain in the UI environment. When a client request is received to access the custom application, the catalog and role checks can be performed to determine whether the client has rights to access the custom application. If the client successfully passes the checks, the custom application can be run at 657.

Figure 7:
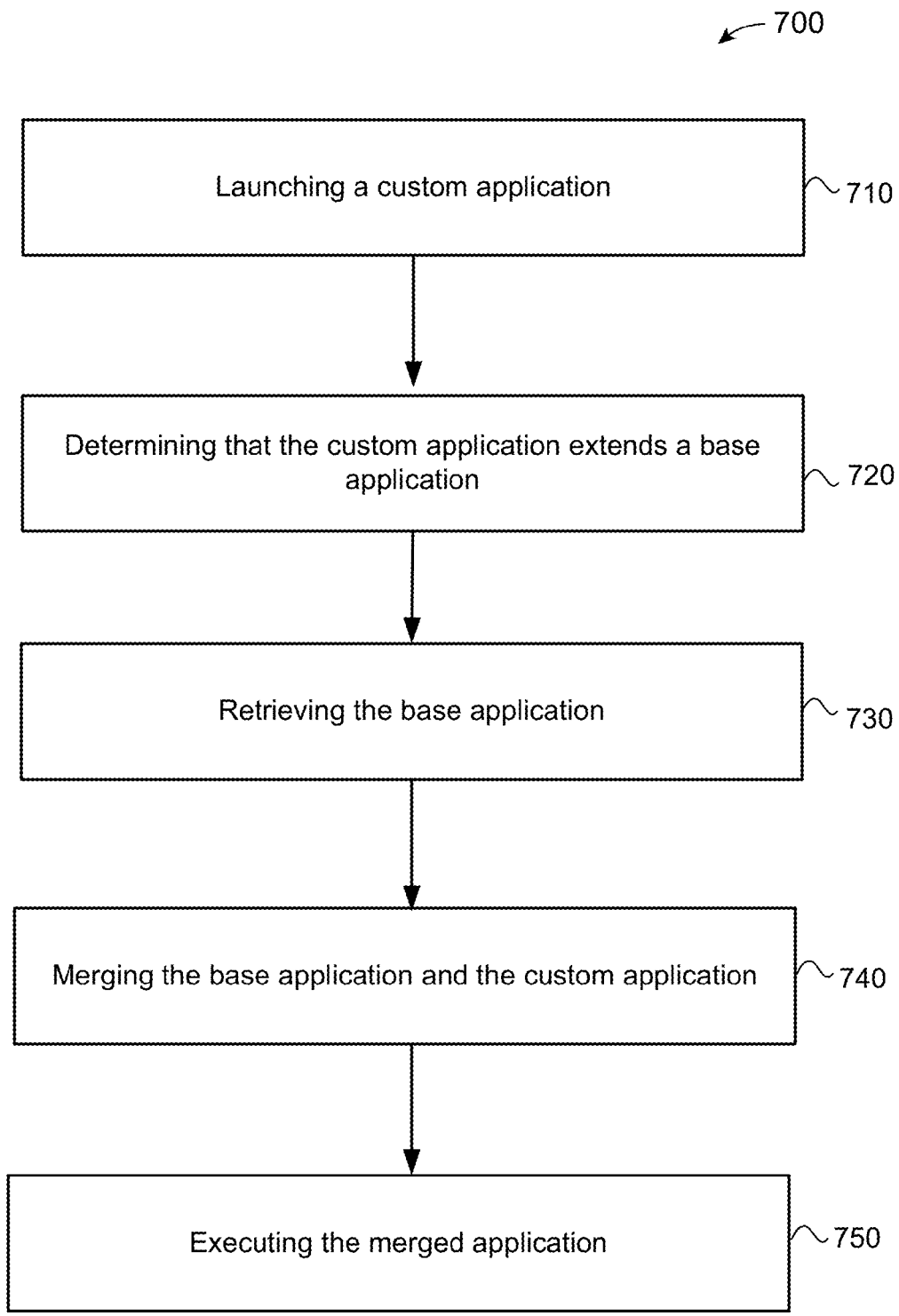
FIG. 7 illustrates a process flow for executing a custom application according to one embodiment.

FIG. 7 illustrates a process flow for executing a custom application according to one embodiment. Process 700 can be stored in computer readable medium and performed by a runtime framework on the web browser. Process 700 begins by launching a custom application at 710. In one embodiment, the custom application can be launched by a runtime framework on a web browser. Process 700 then continues by determining that the custom application extends a base application at 720. In one embodiment, process 700 can determine that an identifier corresponding to the base application is present in a component of the custom application. The component can be component 315 which stores information to configure the custom application. Process 700 then continues by retrieving the base application at 730. The base application can be retrieved from a user interface environment accessible by the web browser. Once the base application has been retrieved, process 700 can continue by merging the base application and the custom application at 740. Merging the two applications can include using resources, views, and controllers of the base application by default unless a similar resource, view, or controller has been defined in the custom application. Custom resources, views, and controllers in the custom application can take precedence over similarly named resources, views and controllers in the base application. In some examples, lifecycle controllers with the same name can be performed one after the other. Once the custom application and the base application have merged, the merged application can be executed at 750.

Figure 8:
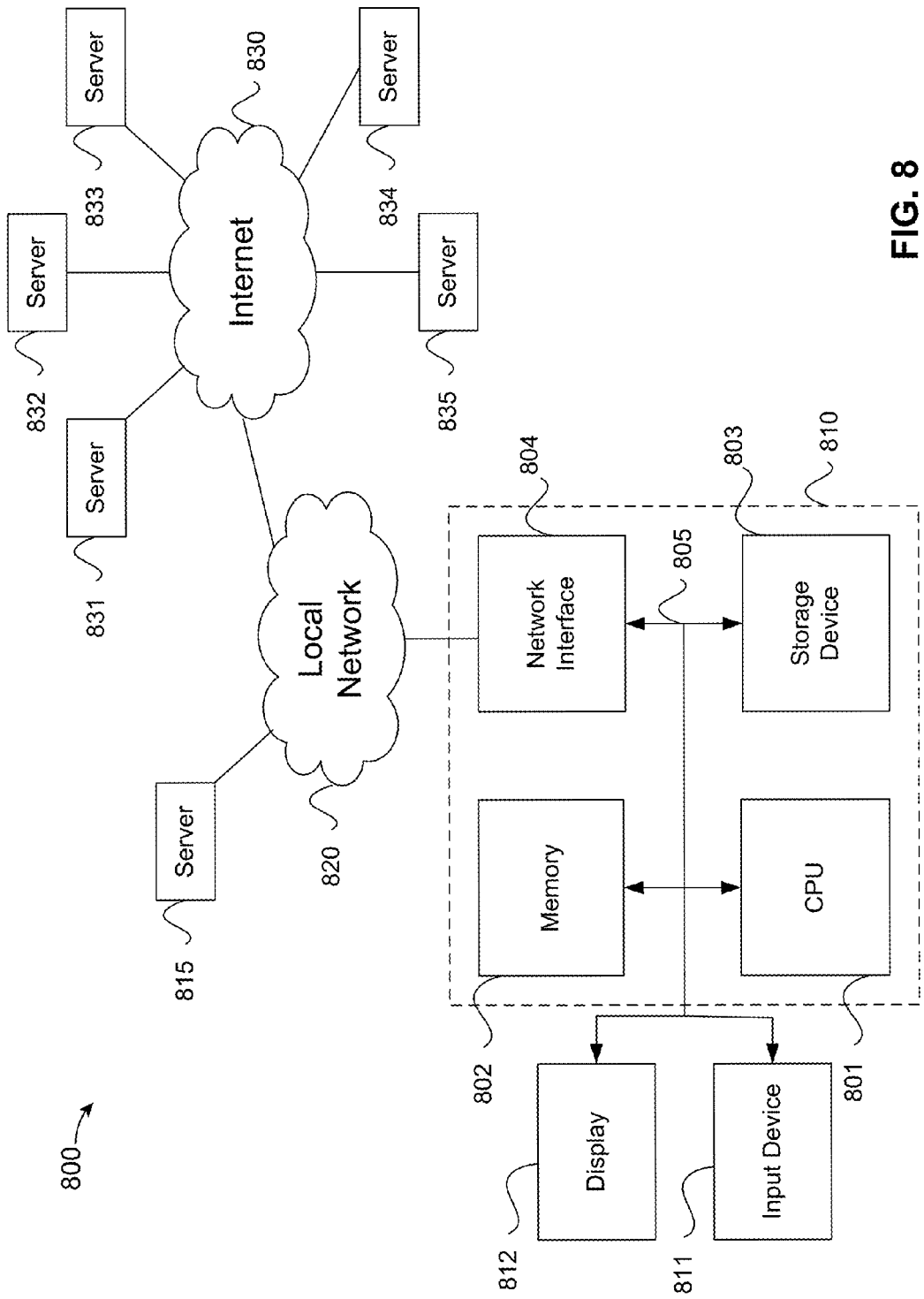
FIG. 8 illustrates an exemplary computer system according to one embodiment.

An exemplary computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    launching, by the processor, a custom application from inside a web browser;
    determining, by the processor, that the custom application extends a base application provided by a service provider, including determining that the custom application includes configuration metadata referencing an extension to a portion of the base application, wherein the portion is a controller belonging to the base application;
    retrieving, by the processor, the base application from the service provider;
    merging, by the processor, the base application and the custom application; and
    executing, by the processor, the merged application on the web browser, wherein a first method of the extension is called by the custom application before a second method of the controller when the first method and the second method are controller end-of-lifecycle methods having the same name.

2. The computer-implemented method of claim 1, wherein the base application and the custom application are both configured to generate at least one view to present data from the service provider.

3. A non-transitory computer readable storage medium storing one or more programs, the one or more programs comprising instructions for:
    launching a custom application from inside a web browser;
    determining that the custom application extends a base application provided by a service provider, including determining that the custom application includes configuration metadata referencing an extension to a portion of the base application, wherein the portion is a controller belonging to the base application;
    retrieving the base application from the service provider;
    merging the base application and the custom application; and
    executing the merged application on the web browser, wherein a first method of the extension is called by the custom application before a second method of the controller when the first method and the second method are controller end-of-lifecycle methods having the same name.

4. The non-transitory computer readable storage medium of claim 3, wherein the base application and the custom application are both configured to generate at least one view to present data from the service provider.

5. A computer implemented system, comprising:
    one or more computer processors; and
    a non-transitory computer-readable storage medium comprising instructions, that when executed, control the one or more computer processors to be configured for:
    launching a custom application from inside a web browser;
    determining that the custom application extends a base application provided by a service provider, including determining that the custom application includes configuration metadata referencing an extension to a portion of the base application, wherein the portion is a controller belonging to the base application;
    retrieving the base application from the service provider;
    merging the base application and the custom application; and
    executing the merged application on the web browser, wherein a first method of the extension is called by the custom application before a second method of the controller when the first method and the second method are controller end-of-lifecycle methods having the same name.

6. The computer implemented system of claim 5, wherein the base application and the custom application are both configured to generate at least one view to present data from the service provider.

7. The computer implemented system of claim 5 wherein the instructions:
    configure the custom application with a catalog and a role; and
    perform a catalog check and a role check prior to the merging.

8. The computer implemented method of claim 1 wherein the custom application is configured with a catalog and a role, and the method further comprises performing a catalog check and a role check prior to the merging.

9. The non-transitory computer readable storage medium of claim 3 wherein the one or more programs comprise instructions for:
    configuring the custom application with a catalog and a role; and performing a catalog check and a role check prior to the merging.

* * * * *